United States Patent
Haibara et al.

(10) Patent No.: US 7,074,316 B2
(45) Date of Patent: Jul. 11, 2006

(54) FUNCTIONAL WATER, METHOD AND APPARATUS OF PRODUCING THE SAME, AND METHOD AND APPARATUS OF RINSING ELECTRONIC PARTS THEREWITH

(75) Inventors: Teruo Haibara, Hikari (JP); Kenichi Uemura, Hikari (JP); Masaaki Kato, Yokohama (JP); Kuniaki Yamada, Fujisawa (JP); Yoshinori Nishiki, Fujisawa (JP); Tsuneto Furuta, Fujisawa (JP)

(73) Assignees: Permelec Electrode Ltd., Kanagawa (JP); Puretron Ltd., Kanagawa (JP)

( * ) Notice: Subject to any disclaimer, the term of this patent is extended or adjusted under 35 U.S.C. 154(b) by 332 days.

(21) Appl. No.: 10/402,990

(22) Filed: Apr. 1, 2003

(65) Prior Publication Data
US 2003/0188764 A1    Oct. 9, 2003

(51) Int. Cl.
*C02F 1/461* (2006.01)

(52) U.S. Cl. .................. 205/521; 204/263; 204/265; 204/290; 204/294; 205/466; 205/746

(58) Field of Classification Search ............ 134/2, 134/3, 26, 1.3, 902; 210/748; 205/746; 510/175; 204/164, 263; 438/689
See application file for complete search history.

(56) References Cited

U.S. PATENT DOCUMENTS

| | | | |
|---|---|---|---|
| 5,900,127 A * | 5/1999 | Iida et al. | 204/290.08 |
| 6,235,186 B1 * | 5/2001 | Tanaka et al. | 205/521 |
| 6,533,916 B1 * | 3/2003 | Puetter et al. | 205/188 |
| 6,761,815 B1 * | 7/2004 | Nakajima et al. | 205/466 |
| 6,773,575 B1 * | 8/2004 | Nakajima et al. | 205/466 |

FOREIGN PATENT DOCUMENTS

JP          2000204492 A  *  7/2000

* cited by examiner

*Primary Examiner*—Gregory Webb
(74) *Attorney, Agent, or Firm*—Sughrue Mion, PLLC

(57) ABSTRACT

A functional water containing a fluorine-containing component obtained by electrolyzing an aqueous solution containing fluoride ion using electrodes having conductive diamonds, a method of producing the same, and a method and an apparatus of rinsing electronic parts using the functional water as a rinsing water. The fluorine-containing component produced by electrolyzing the fluoride ion using the conductive diamond, has stronger rinsing effect than that of a fluorine-containing component obtained by electrolyzing the fluoride ion itself before electrolysis or the fluoride ion using other electrodes. Therefore, an amount of hydrofluoric acid used can greatly be decreased.

3 Claims, 2 Drawing Sheets

FUNCTIONAL WATER, METHOD AND APPARATUS OF PRODUCING THE SAME, AND METHOD AND APPARATUS OF RINSING ELECTRONIC PARTS THEREWITH

FIELD OF THE INVENTION

The present invention relates to a functional water having high rinsing ability, a method and apparatus for producing the same, and a method and apparatus for rinsing electronic parts such as semi-conductor with the same.

DESCRIPTION OF THE RELATED ART

There has conventionally been devised much rinsing water for removing metals or organic substances, fine particles or contaminations attached to surfaces of electronic parts, including semi-conductors (W. Kern, et al. RCA Review P. 187 (1970)). For example, a solution keeping dense at high temperature of a mixture of hydrogen peroxide, hydrochloric acid and sulfuric acid has been used to remove heavy metals or organic substances from surfaces of silicone wafers, and a mixed solution of hydrogen peroxide and ammonia is mainly used to remove fine particles.

In industrial fields necessitating these rinsings, hydrofluoric acid (HF) or ammonium fluoride (NH4F) is preferable chemicals, and especially, in semi-conductor industries, those are indispensable chemicals because of enabling to etch silicone. However, in case of removing metals having noble oxidation-reduction potential such as copper from surfaces of electronic parts, it has been proposed to mix hydrofluoric acid and hydrogen peroxide or ozone for avoiding re-adhesion of copper ion at a time of etching reaction of silicone.

With minuteness of design rules of devices, requirements to cleanliness on surfaces of silicone wafers have become severer year by year, and it is presupposed that conventional rinsing solutions will not be able to accomplish an objective rinsing degree. Accordingly, a development of a rinsing solution having a high rinsing ability is an important problem.

Most of them are served at high concentration for increasing the rinsing effects, but the concentration or amount necessary for reaction are enough to be less than practical use, and from standpoints of costs taken for treating waste water containing residual chemicals and the protection of environment, it has been an urgent matter to advance studies of decreasing the amount of chemicals used. Due to many efforts, the amounts of chemicals used, in particular, sulfuric acid or hydrochloric acid, have been reduced every year.

Of those chemicals, the using amounts of hydrofluoric acid and hydrogen peroxide go down to 0.1 to 0.5% in concentration, but in an after-treatment of hydrofluoric acid, since it is recovered only as a compound as $CaF_2$, a further decrease thereof is demanded, and therefore developments of a new rinsing water and a rinsing method are necessary.

It has recently been reported that an electrolytically functional water (hereinafter referred to as "functional water" for brevity) having an oxidizing property or a reducing property generated by electrolyzing the water may be applied to various fields such as medical cares, foods and others, and in many cases, hydrochloric acid, ammonium chloride or pure water is electrolyzed.

Even in the above-described rinsing process of electronic parts, comparing with the conventional addition of chemicals, dangers by storage or transportation are less because of being on-site, and since the cost for treating the waste water can be reduced, the functional water is given attention.

An electrolytic method for producing the functional water uses a clean electric energy to control chemical reaction on the surfaces of the electrodes, thereby generating hydrogen, oxygen, ozone, or hydrogen peroxide, so that it is possible to indirectly dissolve substances to be treated, or directly electrolyze the substances adsorbed to the electrodes.

In an oxidizing reaction at the anode, it is known that oxidants (available chlorine, or ozone) useful to the water treatments are generated, and active seeds as OH radical partially generate, and they are widely used under names of active water, functional water, ionic water or sterilizing water (see, e.g., "Elementary knowledge of Strong acidic electrolytic water" issued by Ohm Co.). On the other hand, an ozone water dissolved with ozone gas or a hydrogen water dissolved with hydrogen gas have strong oxidizing power or reducing power, and because of being safe in dissolved products, these waters and oxygen are broadly used.

In producing these functional waters, ferrite, lead oxide, stannic oxide, platinum, DSA, graphite, or amorphous carbon (glassy carbon: GC) is used as an anode at which oxidizing reaction proceeds, and iron, platinum, titanium or carbon is used as a cathode of performing reduction.

For the purpose of producing the rinsing water of electronic parts, materials that can be used as electrodes desirably have corrosion resistance from the standpoints of a long life and that pollution does not occur on treated surfaces. In particular, current suppliers of anodes are substantially limited to valve metals such as titanium or its alloys, and electrode catalysts are substantially limited to noble metals such as platinum, iridium, or their alloys. It is known that even if using such expensive materials, catalysts or substrates are inevitably consumed, and elute into the solution. Therefore, electrodes of more excellent corrosion resistance are demanded.

Especially, when fluorine compound or ion exist, there are problems that electrode materials having durability are less, and stable electrolytic action is difficult, or current efficiency of objective reaction is insufficient, and it has not yet been practiced to electrolyze an electrolytic solution containing fluorine compound or fluoride ion to obtain a functional water.

On the other hand, since a diamond is excellent in heat conductivity, optical permeability, or durability to high temperature and oxidation, and is possible to control electric conductivity especially by doping, this is hopeful as a semi-conductor device or energy conversing element. Swain et al. (Journal of Electrochemical Society vol. 141, 3382-, (1994)) reported stability of the conductive diamond as an electrochemical electrode in an acidic electrolytic solution, and suggested that it was far excellent in comparison with other carbon materials. Further, it has been reported that, giving attention to magnification of band gap as 4.5 eV, reduction of NOx to ammonium was possible (Journal of Electroanalytical Chemistry, vol. 396, 233-, (1995) and Electrochemistry vol. 60, 7the edition 659-, (1992)). U.S. Pat. No. 5,399,247 suggests that an organic waste water can be decomposed using the conductive diamond as anode materials.

Not yet enough reporting of industrial applications in high potential areas when current density is large, it has recently been reported that diamond electrodes are inactive to a decomposition reaction of the water, and ozone or hydrogen peroxide other than oxygen generates in the oxidizing reaction (JP-A-9-268395 and 11-269686). Hydrogen peroxide or ozone is a material generating OH radical having more oxidizing power, and it is known that the radical is easy to generate under their co-existence. JP-A-2001-192874 discloses a method of producing persulfuric acid using the diamond electrodes.

SUMMARY OF THE INVENTION

Of various kinds of rinsing waters including the above-described rinsing water of semi-conductors, the invention intends to put a fluorine-containing rinsing water into practice.

One object of the invention is to provide a functional water having excellent rinsing ability comprising fluoride ions a main raw material by using special electrodes, and a method and apparatus of producing the same.

The invention also intends to put the fluorine-containing rinsing water as the above water for rinsing electronic parts into practice.

Another object of the invention to provide a method and apparatus of rinsing electronic parts using the rinsing water having high rinsing ability comprising fluoride ions as a main raw material by using special electrodes.

The functional water according to the invention comprises a fluorine-containing component obtained by electrolyzing an aqueous solution containing fluoride ions using electrodes having conductive diamonds.

The method of producing a functional water according to the invention comprises supplying an aqueous solution containing fluoride ions into an anode chamber of an electrolytic cell which is divided into at least an anode chamber accommodating an anode having conductive diamonds and a cathode chamber by a separator, passing electricity between both electrodes, and producing the functional water containing fluorine-containing component in the anode chamber.

The apparatus of producing a functional water according to the invention comprises an electrolytic cell which is divided into at least an anode chamber for accommodating an anode having conductive diamonds and a cathode chamber by a separator, an aqueous solution containing fluoride ions being supplied in the anode chamber and electricity being passed between both electrodes, thereby producing the functional water containing fluorine-containing component in the anode chamber.

The method of rinsing electronic parts according to the invention comprises rinsing electronic parts using a rinsing water containing a fluorine-containing component obtained by electrolyzing an aqueous solution containing fluoride ions using electrodes having conductive diamonds.

Further method of rinsing electronic parts according to the invention comprises rinsing electronic parts using a rinsing water containing a fluorine-containing component and a sulfur-containing component, obtained by electrolyzing an aqueous solution containing fluoride ions and sulfate ions using electrodes having conductive diamonds.

The apparatus of rinsing electronic parts according to the invention comprises an electrolytic cell which is divided into at least an anode chamber for accommodating anode having conductive diamonds and a cathode chamber, an aqueous solution containing fluoride ions being supplied to the anode chamber, electricity being passed between both electrodes, thereby producing a functional water containing fluorine-containing component in the anode chamber, and means for jetting the rinsing water to the electronic parts or immersing the electronic parts in the rinsing water.

Figure 1:
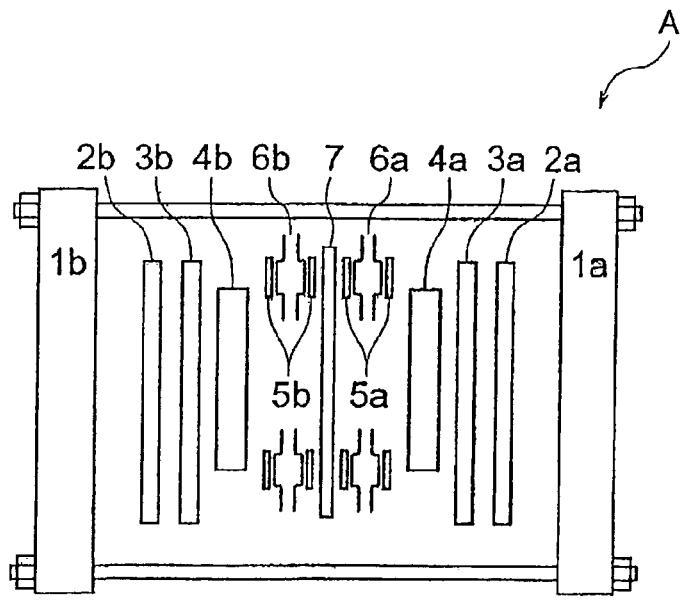
FIG. 1 is a schematic view showing an electrolytic cell for producing the functional water according to the invention.

In the drawings:
A: Electrolytic cell
1a, 1b: Cell press
2a, 2b: Insulating plates
3a, 3b: Electric supply plates
4a: Conductive diamond electrode
4b: Cathode
5a, 5b: Gaskets
6a, 6b: Spacer and waste solution exit
7: Separator
11: DC source
12: Raw aqueous solution tank
14: Gas-liquid separator
15: Raw chemical solution supply pump
16: Functional water supply pump
17: Functional water storage tank
18: Functional water circulating pump
19: Immersion type rinsing chamber

DETAILED DESCRIPTION OF THE INVENTION

The invention will be explained in detail below.

Where electrolysis is carried out using the conductive diamond electrodes in an electrolytic solution containing fluoride ions as an electrolyte according to the invention, rinsing water containing a fluorine-containing component of high activity is generated and this rinsing water has considerably high rinsing ability as compared with other rinsing waters.

Anodic reaction in the electrolytic cell of the invention is as follows because of being the aqueous solution.

Anode:

$$2H_2O = O_2 + 4H^+ + 4e \quad (1.23V)$$

$$3H_2O = O_3 + 6H^+ + 6e \quad (1.51V)$$

$$2H_2O = H_2O_2 + 2H^+ + 2e \quad (1.78V)$$

Oxygen generates preferentially in an equilibrium theory, but due to existence of activated overvoltage, generation of ozone and hydrogen peroxide is possible.

Herein, it is assumed that if fluoride ion exists, oxygen fluoride compound is generated, and the oxygen fluoride compound is generically expressed by $F_2O$ (oxygen difluoride) and $F_2O_2$ (dioxygen difluoride). For example, oxygen difluoride is generated as follows.

$$2HF + H_2O = F_2O + 4H^+ + 2e \quad (2.12V)$$

Depending on the concentration of fluoride ion, since dissociation equilibrium is present ($HF + F^- = HF_2^-$), the generation of oxygen fluoride compound may be supposed as follows.

$$HF_2^- + H_2O = F_2O + 3H^+ + 2e \quad (2.21V)$$

Depending on the electrolyzing conditions, fluorine gas may be generated.

$$2F^- = F_2 + 2e \quad (2.87V)$$

If sulfate ion exists, persulfuric acid is generated.

$$2SO_4^{2-} = S_2O_8^{2-} + 2e \quad (2.01V)$$

It is considered that these activated compounds are dissolved in the electrolytic solution, whereby the active functional water is produced, and detailed sequences are not seen, but may be assumed as follows.

It is expected that at first the water is oxidized on the diamond surfaces, oxygen chemical seeds are formed on the electrode surfaces, and then oxygen and ozone are generated, but due to the chemical stability of diamonds, oxidation of the water molecule is assumed to be actually difficult to occur.

On the other hand, fluoride ion is anion and will be easy to be adsorbed to the anode surface even at low potential.

It is reported that generally, in the solution of sulfuric acid, the generating efficiency of ozone goes up by addition of fluoride ion, and it is contemplated that this fact is because desorption as oxygen gas is suppressed by interaction between electrolytic oxidation adsorbing species of the water molecule (atomic oxygen) and atomic fluorine.

The above contemplations suggest that the generation of oxygen fluoride compound by reaction between the adsorbed fluorine atom and the water occurs on the conductive diamond electrodes competitively with oxygen, ozone and hydrogen peroxide, and it is assumed that the oxygen fluoride compound which may be assumed to be generated improves the rinsing ability of the functional water.

Compounds of fluoride ion applicable in the invention include $NH_4F$ (ammonium fluoride), HF (hydrofluoric acid), or $H_2SiF_6$ (silicic acid fluoride). The concentration of fluoride ion is preferably 0.0001M or higher, and from the viewpoint of a selecting property of reactions, the high concentration is desirable, while from economics and stability of materials of electrodes, the low concentration is desirable, and therefore, 0.01M is preferable. The upper limit is not particularly limited, and arbitrary densities until saturation are usable.

Materials used as anode catalysts for oxidation and substrates are necessary to have corrosion resistance from viewpoint of a long life and no contaminations on treated surfaces. In particular, it is known that if fluoride ion exists, catalyst components or electrode substrates are easily dissolved, and thus, electrodes having more excellent corrosion resistance are demanded. Significantly, the anode of the invention is a material which is difficult to proceed the oxidizing reaction of the water at a theoretically generated potential of oxygen fluoride compound. This is assumed that since the conductive diamond electrodes show large overvoltage to the oxidizing reaction of the water, which is in a range where the formation reaction of, for example, the oxygen fluoride compound, can proceed potentially, the highly functional water is produced.

The substrate of the electrode where the actual conductive diamond is the catalyst has no problem so long as it is a conductive material. The substrate is preferably plates, stamped plate, meshes, power sintered body, or metal fabric sintered body of titanium, niobium, tantalum, zirconium, silicon, silicon carbide, carbon, tungsten carbide or the like, which are stable in the diamond synthesis conditions described hereinafter. It is also preferable to form an intermediate layer for purpose of adhesion and protection of the substrate. The intermediate layer includes carbides or oxides of the above metals. The surface is preferably polished to increase adhesion and reacting areas.

At this time, if the diamond particles are used as nuclei and adhered to the substrate, it is effective to growth of uniform diamond layers. A hot filament CVD, a microwave plasma CVD, a plasma arc jet method, or a PVD method is developed as a diamond forming method. Synthetic diamond particles by conventional super high pressure method can be used if using a bonding material such as resins. Especially, if using hydrophobic components such fluorine resin to the electrode surfaces, substances to be treated are easily trapped, so that the reaction efficiency can be improved.

Next, explanation will be made to the hot filament method CVD as a typical diamond production. An organic substance such as alcohol becoming a carbon source is kept in a reducing atmosphere such as hydrogen gas, and heated to temperature of 1,800 to 2,400° C. at which carbon radicals generate. At this time, the electrode substrates are installed in a temperature range (750 to 950° C.) at which diamonds precipitate. The gas concentration of the organic compound to hydrogen is 0.1 to 10 vol %, and rate of feed is 0.01 to 10 liter/min, although depending on sizes of reaction vessels, and pressure is 0.001 to 0.1 MPa.

Fine diamond particles have diameters of 0.01 to 10 μm, so that a coating thickness of the conductive diamond is preferably 0.1 to 50 μm, more preferably 1 to 10 μm, for the purpose of preventing permeation of a liquid into the substrate. It is indispensable to add a slight amount of elements having different valences in order to obtain good conductivity. The content of boron or phosphorus is preferably 1 to 100,000 ppm, more preferably 100 to 10,000 ppm. Boron oxide or diphosphorus pentaoxide of less toxicity are preferably used as raw compounds.

The electrolytic cell used desirably has at least two chambers of anode and cathode chambers partitioned by a separator.

If using the separator, since activated substances generated at the anode are reduced and therefore not decomposed and influences of by-products can be minimized, the separator is desirably used. Particularly, in the solution having low conductivity, an ion-exchange membrane is preferably used for increasing conductivity. The ion-exchange membrane can be any of fluorine resin type or hydrocarbon resin type, but the former is preferable in the point of corrosion resistance. Commercially available membranes are Nafion, Aciplex and Flemion.

In case that it is necessary to adhere the electrodes to the membranes, it is sufficient to in advance combine mechanically them, or to apply pressure when electrolyzing. Preferable pressure is 0.01 to 3 MPa. Porous hydrophilic materials (Poreflon by Sumitomo Denko) of fluorine resin type having high corrosion resistance can also be used as the separator.

The smaller the distance between electrode-electrode, or separator-electrode (in the case of the electrolytic cell using separators), the better because the cell voltage goes down. However, the fluoride ion should be applied to the electrolytic face at sufficient speed, and therefore an appropriate distance is necessary. Distances between 0.1 and 10 mm are suitable. Therefore, the solution between the electrodes is preferably agitated and circulated.

Current density is preferably 0.001 to 100 A/dm².

The cathode includes a hydrogen generating electrode and an oxygen gas electrode, but the cathode is not particularly limited so long as it has corrosion resistance. The former is significant in view of using the conductive diamond. In the latter, if using carbon or a gold catalyst, hydrogen peroxide can be concurrently generated by oxygen reduction at the cathode.

In the case of the oxygen gas electrodes, the supplying amount of oxygen is 1.2 to 10 times of a theoretical amount.

Temperature of the electrolytic solution is preferably 5 to 40° C. Since a boiling point of hydrogen fluoride is around 20° C., it is preferable to operate the cell at room temperature in order to increase efficiency of applying to the electrolysis.

If low concentration, ion is dissociated, and an amount of gasifying by HF is very small, but a portion of gasifying in a range of high concentration cannot be ignored. If increasing pressure, a gasified portion can be usefully re-dissolved, and the efficiency of generating the functional water is advantageously improved. The pressure in such a case is preferably 0.1 to 1 MPa.

Another electrolyte than the fluoride ion can be added, and according to purposes, hydrochloric acid, sulfuric acid, nitric acid or acetic acid other than the fluoride ion may be added. This can expect an effect such that in the case that the concentration of the fluoride ion is low, voltage of electrolytic cell can be avoided from increasing, and an effect of an electrolytically synthesized oxidizing substance can be utilized.

Materials for the electrolytic cell preferable are quartz, quartz-lined materials, carbon, titanium, stainless steels or PTFE resins from the standpoint of durability.

In the electrode reaction of the invention, oxygen generates as a side reaction. If air bubbles remain in the rinsing water during rinsing, they are adhered to treated surfaces and disturb cleanliness on the surfaces. Accordingly, degassing (bubble separation) before application to the rinsing process is desirable. As to degassing, if the functional water produced is once received in a tank, moderating a flowing rate, and is allowed to stand for a certain period of time, the separation can be carried out by the difference in specific gravity. Thus, the degassing is simplified.

Since the functional water according to the invention maintains the rinsing ability during storage for several days, it is possible to operate the electrolytic cell at time other than serving, and store the functional water.

As the rinsing method, electronic parts to be rinsed are immersed in the electrolytic functional water, or jetted therewith. High temperature at rinsing is effective to increase the rinsing efficiency. It is further possible to use a pump for circulating the rinsing water between the electrolytic cell and the rinsing water tank, and then use it for rinsing.

The functional water of the invention is used to rinsing electronic parts which include, for example, liquid crystal materials, magnetic storage media, light disks, IC circuits, and their production containers, as well as semiconductors.

The electrolytic cell for producing the functional water according to the invention and means for supplying the functional water obtained thereby to electronic parts are explained on the basis of one example shown in the attached drawings, but the invention is by no means limited thereto.

FIG. 1 is a schematic view showing the electrolytic cell for producing the functional water according to the invention.

The electrolytic cell A comprises a pair of an anode cell press 1*a* and a cathode cell press 1*b* at both sides; and an anode insulating plate 2*a*, an anode supply plate 3*a*, a conductive diamond anode 4*a*, an anode gasket 5*a*, an anode spacer and waste liquid exit 6*a*, a membrane 7, a cathode spacer and waste liquid exit 6*b*, a cathode gasket 5*b*, a cathode 4*b*, a cathode supply plate 3*b*, and a cathode insulating plate 2*b*, which are laminated in the order of from the anode cell press 1*a* toward the cathode cell press 1*b*.

If electric current is passed between both electrodes while supplying the electrolytic liquid having the fluoride ion into the anode chamber of the electrolytic cell, it is assumed that the oxygen fluoride compound is generated, and as a result, the functional water having the excellent rinsing ability is obtained.

Figure 2:
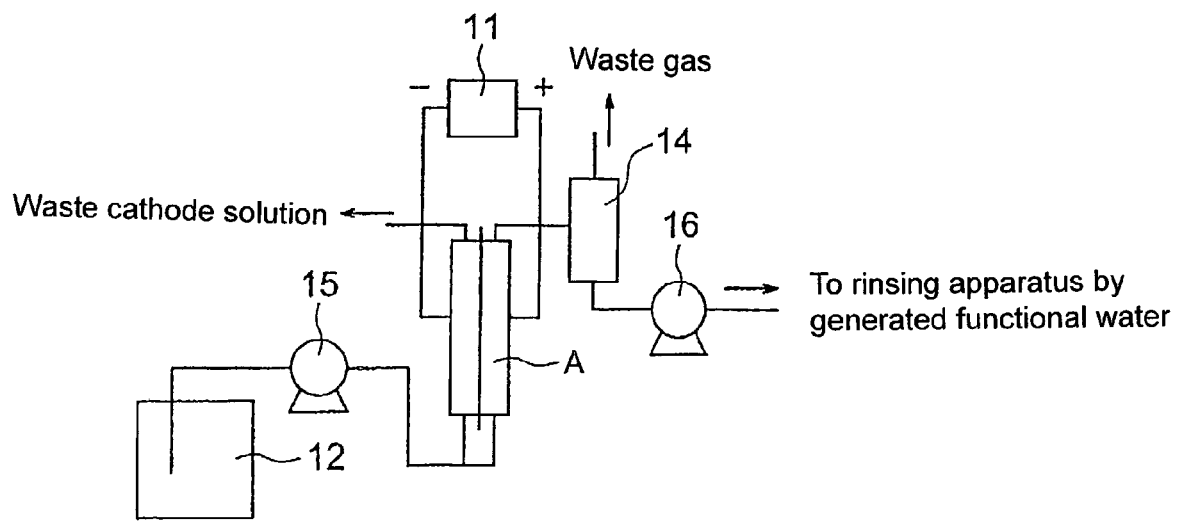
FIG. 2 is a schematic view showing a flow of functional water production of a one pass type using the electrolytic cell of FIG. 1.
Figure 3:
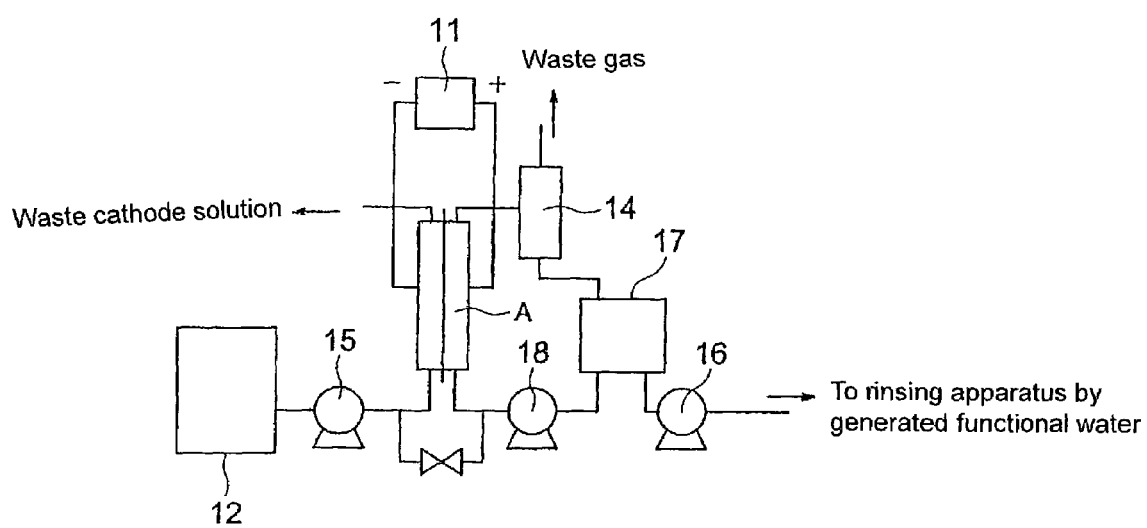
FIG. 3 is a schematic view showing a flow of functional water production of a circulation type using the electrolytic cell of FIG. 1.
Figure 4:
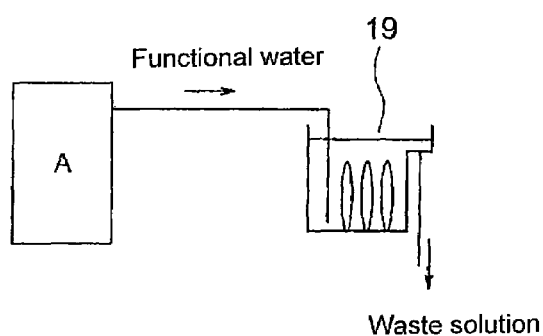
FIG. 4 is a schematic view showing a flow of functional water production of a batch type using the electrolytic cell of FIG. 1.

FIG. 2 is a schematic view showing a flow of the functional water production of one pass type using the electrolytic cell of FIG. 1, FIG. 3 is a schematic view showing a flow of the functional water production of a circulation type using the electrolytic cell of FIG. 1, and FIG. 4 is a schematic view showing a flow of the functional water production of a batch type using the electrolytic cell of FIG. 1.

In FIGS. 2 and 3, 11 is a DC source which may be any of a switching type or a thyristor type. The water containing fluoride ion in a raw aqueous solution tank 12 is supplied to the electrolytic cell A via a raw chemical solution pump 15.

In the one pass type of FIG. 2, the functional water produced in the electrolytic cell A is sent to a point (electronic parts) using the functional water by a functional water supply pump 16 after removing air bubbles from the functional water by a gas-liquid separator 14.

On the other hand, in the circulation type of FIG. 3, the functional water produced in the electrolytic cell A is stored in a functional water tank 17 after removing air bubbles from the functional water by the gas-liquid separator 14, and a part thereof is, similar to FIG. 2, sent to the point using the functional water by the functional water supply pump 16, and a rest balance is circulated to the electrolytic cell A via a functional water circulating pump 18 and is again electrolyzed.

In the batch type of FIG. 4, the functional water produced in the electrolytic cell A is directly supplied to an immersion typed rinsing cell 19 for rinsing an apparatus to be rinsed (electronic parts).

In this example, liquid contacting parts in pipe arrangements of the electrolytic cell and other parts are desirably constituted of pipes or tanks stable against fluoride ion, and chemically stable resins of less impurities, such as PP, PE, PFA or PTFE. Are preferable.

Supply pumps include such types as magnet, magnet determination, tube, or bellows, and a liquid contacting part is desirably formed of resins stable against fluoride ion. The raw medicine liquid may be poured into a pure water supply line, or directly supplied into the electrolytic cell. In this case, sufficient circulation or agitation is necessary. The functional water produced is stored in a tank made of quartz or PTFE, and is preferably prevented from the air contact until immediately before using. The rinsing cell is constituted of similar materials. Nozzles for rinsing objectives are made of PTFE or quartz. Objectives are placed in the rinsing container of the functional water via a transportation apparatus.

Examples will be described as follows, which used the functional water produced by the invention, and evaluated contaminated metal removing abilities from the silicone wafer surfaces. The examples do not limit the invention.

Electrolytic Apparatus

Two sheets of silicones plates (3 mm thickness) were used, which were formed with the conductive diamonds (boron doping concentration: 1,500 ppm) to be 10 μm thickness as an anode and a cathode, and Nafion 350 (made by Du pont) of the anode ion exchanging membrane was placed between the silicone plates. The distances between the electrode membranes were 5 mm respectively to constitute an electrolytic cell having an electrolytic available area of 80 cm$^2$ as shown in FIG. 1.

Production of Functional Water

While circulating 4 liters of a raw solution having the predetermined composition in a tank at a flow rate of 100 to 200 ml/min respectively to the cathode chamber and the anode chamber, the solution was electrolyzed at the predetermined current density for 30 minutes, whereby the desired functional water was produced.

Evaluation of Contaminated Metal Removing Ability

APM rinsing solution (functional water), in which aqueous ammonia having a concentration of 29%, hydrogen peroxide having a concentration of 31% and pure water were adjusted to a volume ratio of 1:1:5, was mixed with impurities of Al, Fe and Cu. Pure silicone wafer was dipped in the resulting solution at 80° C. for 5 minutes. The silicone wafer was rinsed in pure water for 5 minutes to confirm the hydrophilic property on the surface. The silicon wafer was dried with a spin dryer. In the following, this method is called as an IAP contamination. By the IAP contamination, impurities of heavy metals were adhered to the wafer surface. Thus, the surface was contaminated with impurities.

For evaluating the amount of metals contaminating wafer surface, a frameless atomic absorption analysis method was used as follows.

Contaminating metals on the wafer surface were recovered with a mixture of hydrofluoric acid and nitric acid, and metal concentration in the recovered solution was determined by the frameless atomic absorption analysis method, and calculated in terms of the surface contaminating concentration. The concentrations of metals adhered to the wafer surfaces by the IAP contamination treatment were at levels that Al was $1\times10^{12}$ atoms/cm$^2$, Fe was $1\times10^{11}$ atoms/cm$^2$, Ni was $5\times10^{11}$ atoms/cm$^2$, Zn was $3\times10^{12}$ atoms/cm$^2$, and Cu was $3\times10^{11}$ atoms/cm$^2$.

The thus-prepared IAP contaminated wafers were rinsed with various kinds of functional waters for 5 minutes, rinsed with pure water for 5 minutes, and then dried by a spin dryer.

The contaminating metals were recovered from the wafer surfaces after rinsing treatment by the above-described manner, and the metal concentrations in the recovered solution were determined by the frameless atomic absorption analysis method.

Results of the Rinsing Tests

EXAMPLES 1 TO 6

Electrolysis was conducted at 6 standards that the concentrations of hydrofluoric acid as the raw material were 0.0001M (Example 1), 0.001M (Example 2), 0.01M (Example 3), 0.1M (Example 4), and 1M (Examples 5 and 6), and the rinsing tests were then conducted. In Example 5, the current density was 10 A/dm$^2$, and in Example 6, the current density was 20 A/dm$^2$. In Examples 1 to 3 (the concentration of hydrofluoric acid was 0.01 M or lower), the current density was tried to increase up to 10 A/dm$^2$. However, since the electric resistance of the solution was low, the current density of Example 1 was increased up to only 0.15 A/dm$^2$, the current density of Example 2 was increased up to only 1 A/dm$^2$, and the current density of Example 3 was increased up to only 2 A/dm$^2$. Therefore, the electrolyses were performed at their respective electric densities.

As a result, in Examples 4 to 6 where the concentration of hydrofluoric acid as the raw material was 0.1 to 1 M and the electrolysis was performed at a current density of 10 A/dm$^2$ or higher, impurities of all the metals of Al, Fe, Ni, Zn and Cu could be removed until less than detecting limits as shown in the Table. On the other hand, in Examples 1 to 3 where the concentration of diluted hydrofluoric acid as the raw material was 0.0001 to 0.01 M and the current density could be increased up to only 2 A/dm$^2$, the respective metals could not perfectly be removed as shown in the Table. Thus, it is seen that although the removing abilities in Examples 1 to 3 were somewhat inferior to those of Examples 4 to 6, good removing effects were obtained in spite of insufficient current density.

If the current density could be increased by using an electric source of larger output or adding an electrolyte other than hydrofluoric acid, it is assumed that even if the concentration of diluted hydrofluoric acid is 0.0001 to 0.01 M, high degree of the removing ability can be obtained.

COMPARATIVE EXAMPLES 1 AND 2

When the same rinsing tests were conducted using unelectrolyzed diluted hydrofluoric acid (Comparative Example 1:0.01M, and Comparative Example 2:0.1M) which was different from the functional water prepared by carrying out the electrolysis of Examples 1 to 6, it was apparent that the removing ability was largely inferior to that of Examples 1 to 6 in to all the metals of Al, Fe, Ni, Zn and Cu, as shown in the Table.

EXAMPLES 7 TO 11

Similar to Examples 1 to 6, 5 kinds of aqueous solutions having the concentration of hydrofluoric acid as the raw material of 0.0001M (Example 7), 0.001M (Example 8), 0.01M (Example 9), 0.1M (Example 10), and 1M (Example 11) were prepared. Sulfuric acid was added to the respective aqueous solutions such that the concentration of sulfuric acid was 1M, and the respective resulting solutions were electrolyzed to obtain functional waters. Rinsing tests were conducted at such 5 standards. Because sulfuric acid was added, the electric conductivity of the solution was sufficiently high, and electrolyses at a current density of 20 A/dm$^2$ were all possible. As a result, in Example 7 (0.0001M-HF) that the concentration of diluted hydrofluoric acid was most low, all the metals could be removed until less than the detecting limits, except that Al and Cu remained slightly, as shown in the Table. Regarding Example 7, the removing level was sufficiently high.

COMPATATIVE EXAMPLE 3

When rinsing test was conducted using 1M unelectrolyzed sulfuric acid in the same manner as in Comparative example 1, it is apparent that the removing ability was largely inferior to Examples 1 to 11 in all the metals of Al, Fe, Ni, Zn and Cu, as shown in the Table.

COMPARATIVE EXAMPLE 4

When rinsing test was conducted using a mixed aqueous solution of 0.1M unelectrolyzed diluted hydrofluoric acid and 1M sulfuric acid (the mixture was the same as the raw material before the electrolysis in Example 9), the removing ability of Al was increased as compared with the case of sulfuric acid only (Comparative Example 3), but the removing ability of Cu was poor as compared with Comparative example 3, as shown in the Table. Thus, the overall removing ability was.

COMPARATIVE EXAMPLE 5

When rinsing test was conducted using 1M electrolyzed sulfuric acid aqueous solution (not containing hydrofluoric acid) in the same manner as in Comparative Example 1, it is apparent that the concentration of the remaining metals is high as a whole, and in particular, the removing abilities of Al and Cu are inferior, as shown in the Table.

COMPARATIVE EXAMPLE 6

The rinsing test was conducted in the same manner as in Example 9, except that unelectrolyzed hydrofluoric acid was used in place of the electrolyzed hydrofluoric acid. Specifically, the rinsing test was conducted using an aqueous solution obtained by adding unelectrolyzed hydrofluoric acid to 1M sulfuric acid in the same manner as in Comparative Example 1. As a result, it is apparent that the concentration of the remaining metals was low as a whole, but was higher than Example 9 where all the metal concentrations were decreased to less than the detecting limit, as shown in the Table. This fact suggests that a fluorine activated species are generated by electrolyzing hydrofluoric acid, and the metal removing ability is increased.

COMPARATIVE EXAMPLE 7

Silicone wafer was rinsed at about 100° C., using a sulfuric acid-hydrogen peroxide mixed solution (SPM) which is the typical sulfuric acid-based rinsing chemical solution in rinsing electronic parts. SPM is known as the rinsing solution having high metal removing ability. It is apparent that the functional waters (rinsing solution) of Examples 1 to 12 have higher metal removing ability, as shown in the Table.

EXAMPLE 12

The functional water (rinsing solution) before use of Example 10 was allowed to stand in the rinsing tank for about 40 hours, and then used for the rinsing test. The results obtained are shown in the Table. Slight amounts of Fe and Zn were detected, but there was no substantial difference as compared with the metal removing ability of the functional water of Example 10. It is apparent from this fact that the functional water obtained by electrolyzing the mixed solution of hydrofluoric acid and sulfuric acid had a considerably long life of the rinsing ability.

EXAMPLE 13

Functional water was produced under the same conditions as in Example 4, except that the ion exchanging membrane was not placed between the anode and the cathode of the electrolysis apparatus. In this method, the functional water mixing the anode solution and the cathode solution was produced, and as shown in the Table. It is apparent that the concentration of the residual metals was somewhat higher than that of Example 4 (Fe and Cu could be detected), and the functional water had sufficient metal removing ability.

TABLE

| | Sample | HF Concentration (M) | Sulfuric acid concentration (M) | Current density (A/dm$^3$) | Electrolysis time (min) | Al | Fe | Ni | Zn | Cu |
|---|---|---|---|---|---|---|---|---|---|---|
| Ex. 1 | Hydrofluoric acid Electrolysis | 0.0001 | 0 | 0.75 | 30 | 1.9 | 0.4 | 1.1 | 0.4 | 1.8 |
| Ex. 2 | Hydrofluoric acid Electrolysis | 0.001 | 0 | 1 | 30 | 0.5 | 0.1 | 0.2 | 0.1 | 0.8 |
| Ex. 3 | Hydrofluoric acid Electrolysis | 0.01 | 0 | 2 | 30 | 0.2 | 0.1 | ND | ND | 0.3 |
| Ex. 4 | Hydrofluoric acid Electrolysis | 0.1 | 0 | 10 | 30 | ND | ND | ND | ND | ND |
| Ex. 5 | Hydrofluoric acid Electrolysis | 1 | 0 | 10 | 30 | ND | ND | ND | ND | ND |
| Ex. 6 | Hydrofluoric acid Electrolysis | 1 | 0 | 20 | 30 | ND | ND | ND | ND | ND |
| Ex. 7 | (Hydrofluoric acid and sulfuric acid) Electrolysis | 0.0001 | 1 | 20 | 30 | 0.7 | ND | ND | ND | 0.4 |
| Ex. 8 | (Hydrofluoric acid and sulfuric acid) Electrolysis | 0.001 | 1 | 20 | 30 | ND | ND | ND | ND | ND |
| Ex. 9 | (Hydrofluoric acid and sulfuric acid) Electrolysis | 0.01 | 1 | 20 | 30 | ND | ND | ND | ND | ND |

TABLE-continued

| | | | | | | | | | | |
|---|---|---|---|---|---|---|---|---|---|---|
| Ex. 10 | (Hydrofluoric acid and sulfuric acid) Electrolysis | 0.1 | 1 | 20 | 30 | ND | ND | ND | ND | ND |
| Ex. 11 | (Hydrofluoric acid and sulfuric acid) Electrolysis | 1 | 1 | 20 | 30 | ND | ND | ND | ND | ND |
| Ex. 12 | Allowing to stand Example 10 for 40 hours | 0.1 | 1 | 20 | 30 | ND | 0.1 | ND | ND | ND |
| Ex. 13 | Hydrofluoric acid Electrolysis (No separator) | 0.1 | 0 | 10 | 30 | ND | 0.1 | ND | 0.1 | 0.5 |
| Com. Ex. 1 | Hydrofluoric acid | 0.01 | 0 | | | 13.2 | 0.3 | 1.8 | 0.2 | 10.5 |
| Com Ex. 2 | Hydrofluoric acid | 0.1 | 0 | | | 18.8 | 7.7 | 1.6 | 0.2 | 8.4 |
| Com. Ex. 3 | Sulfuric acid | 0 | 1 | | | 8.3 | 0.1 | 0.3 | 0.2 | 21.6 |
| Com. Ex. 4 | Hydrofluoric acid and sulfuric acid | 0.01 | 1 | | | 0.7 | 0.7 | 0.2 | 0.1 | 23.4 |
| Com. Ex. 5 | Sulfuric acid Electrolysis | 0 | 1 | 20 | 30 | 8.4 | 0.1 | 0.2 | 0.4 | 1.7 |
| Com. Ex. 6 | Hydrofluoric acid (Sulfuric acid Electrolysis) | 0.01 | 1 | 20 | 30 | 0.7 | 0.1 | 0.3 | 0.2 | 0.8 |
| Com. Ex. 7 | Sulfuric acid-hydrogen peroxide mixed aqueous solution | | | | | 1.9 | 1.5 | 1.0 | 0.3 | 0.9 |
| | Contamination level at initial period | 100 | | 10 | | 50 | | 30 | | 30 |
| | Limit value of determination | 0.18 | | 0.05 | | 0.14 | | 0.07 | | 0.16 |

Note:
Concentration of Al, Fe, Ni, Zn and Cu is all "$\times 10^{10}$ atoms/cm$^2$".

The invention provides the functional water containing a fluorine-containing component obtained by electrolyzing an aqueous solution containing fluoride ion using electrodes having conductive diamonds.

The fluorine-containing component (assumed as oxygen difluoride or dioxygen difluoride) generated by electrolyzing the fluoride ion using the conductive diamonds has the stronger rinsing effect than that of the fluorine-containing component obtained by electrolyzing the fluoride ion itself before electrolyzing or the fluoride ion using other electrodes, and the effect thereof is especially remarkable when the concentration of the fluoride ion is 0.0001M or more. In addition, the amount of hydrofluoric acid used can largely be saved.

This fact is assumed that adhered metals difficult to be removed with ordinary high concentration medicine methods can be easily removed with a low concentration chemical solution and the electrolysis energy, whereby the following industrial and economical effects can be expected.

1) Functional water having high rinsing ability is obtained.
2) Environmental load due to use of chemicals can be lowered.
3) It is not necessary or can be saved to use expensive pipes or materials having excellent corrosion resistance for the apparatus, which had to be utilized for using or storing high concentration chemicals.
4) Costs for waste water treatment after use can be decreased.
5) Safety to workers can be improved.
6) It is possible to largely decrease the using amount of super pure rinsing water which was required in large amount to high concentration chemicals.
7) Since the electrodes are very stable during use and at stopping, a protecting current circuit, a power source or a battery, for preventing catalyst deterioration, can be omitted, and the production costs can be decreased as the electrolyzed functional water generating apparatus.

Where the functional water further contains, as the raw material, sulfuric acid ion other than the fluoride ion, the rinsing effect is more increased.

In producing the functional water by electrolyzing the fluoride ion using the conductive diamond electrodes, if a separator type electrolytic cell is used, the fluorine-containing component generated at the anode contacts with the cathode, thereby preventing decomposition.

If air bubbles in the functional water are removed by degassing, the air bubbles do not remain in the functional water (rinsing solution) in the rinsing process, thus neither causing the air bubbles to adhere to the treated surface nor disturbing cleanliness on the surface.

As described above, the generated rinsing water for electronic parts may be performed to rinsing the electronic parts by jetting to or immersing them in the rinsing water after removing air bubbles in the rinsing water through the air bubble separator.

It should further be apparent to those skilled in the art that various changes in form and detail of the invention as shown and described above may be made. It is intended that such changes be included within the spirit and scope of the claims appended hereto.

This application is based on Japanese Patent Application No. 2000-099553 filed Apr. 2, 2002 and No. 2002-099554 filed Apr. 2, 2002, the disclosures of which are incorporated herein by reference in their entireties.

What is claimed is:

1. An apparatus for producing a functional water comprising a fluorine-containing component, said apparatus comprising:

an electrolytic cell divided by a separator into at least an anode chamber housing an anode comprising conductive diamond and a cathode chamber housing a cathode electrode;

means for supplying an electrolyte comprising an aqueous solution containing fluoride ion in an amount of 0.01M or higher to the anode chamber; and a power source for passing electricity through said electrolytic cell so as to produce said functional water by electrolysis in the anode chamber, wherein said anode chamber comprises an outlet for discharging said functional water, and said apparatus further comprises a liquid-gas separator, said liquid-gas separator receiving functional water discharged from said anode chamber outlet and degassing said functional water.

2. The apparatus of claim 1, further comprising a storage tank, said storage tank receiving and storing degassed functional water from said liquid-gas separator, and recirculation means for recirculating a part of said degassed functional water to the anode chamber.

3. The apparatus of claim 1, wherein the liquid-gas separator is provided separate from the electrolytic cell.

* * * * *

UNITED STATES PATENT AND TRADEMARK OFFICE
CERTIFICATE OF CORRECTION

PATENT NO.        : 7,074,316 B2                                          Page 1 of 1
APPLICATION NO.   : 10/402990
DATED             : July 11, 2006
INVENTOR(S)       : Teruo Haibara et al.

It is certified that error appears in the above-identified patent and that said Letters Patent is hereby corrected as shown below:

On the title page:
    insert --(30) Foreign Application Priority Data:

Japanese Patent Application No. 2002-099553 filed April 2, 2002 and Japanese Patent Application No. 2002-099554 filed April 2, 2002--

Signed and Sealed this

Twenty-second Day of May, 2007

JON W. DUDAS
*Director of the United States Patent and Trademark Office*